United States Patent [19]
Saxl

[11] 3,858,904
[45] Jan. 7, 1975

[54] SAFETY SYSTEMS
[75] Inventor: Karel Saxl, Sutton Coldfield, England
[73] Assignee: Imperial Metal Industries (Kynoch) Limited, Birmingham, England
[22] Filed: Jan. 10, 1973
[21] Appl. No.: 322,543

[52] U.S. Cl............................ 280/150 SB, 188/1 C
[51] Int. Cl............................................. B60r 21/10
[58] Field of Search................ 280/150 SB, 150 B; 188/1 C

[56] References Cited
UNITED STATES PATENTS
3,398,812  8/1968  Peterson ........................... 188/1 C
3,583,530  6/1971  DeVenne ................. 280/150 SB X
3,680,913  8/1972  Seybold............................. 188/1 C Primary Examiner—Robert R. Song
Attorney, Agent, or Firm—Cushman, Darby & Cushman

[57] ABSTRACT

Safety belt system for a motor vehicle, including a belt, normally conventional with an associated energy absorbing device in the form of an extrusion device which extrudes a slug through an orifice when the belt load reaches a predetermined level.

5 Claims, 2 Drawing Figures

PATENTED JAN 7 1975

3,858,904

3,858,904

SAFETY SYSTEMS

BACKGROUND OF THE INVENTION

This invention relates to safety devices and has particular reference to safety devices in which energy is dissipated by extrusion.

One of the main problems involved in a safety device which has to protect, for example, a vehicle passenger in the event of accident, is that the passenger, by virtue of his forward velocity has a considerable amount of energy. Using a conventional seat belt, only some of this energy can be dissipated by plastic deformation of the belt since the belt must be sufficiently strong to prevent the passenger contacting the windscreen or projections inside the vehicle. The belt is usually elastic, and this can sometimes result in the passenger being "whipped" back into his seat in the moments after an impact. Since the belts are applied to the passenger's torso, the head is subjected to a sudden jerk when the passenger hits the seat and this jerk can, in extreme conditions, break the neck of the passenger.

There have been proposals to strap passengers to seats mounted in such a manner that they can move, in the event of an accident, against a restraining force. However, this entails a radical redesign of the interior of the motor vehicle, and also requires the device to withstand the load applied by the seat in addition to that applied by the passenger.

SUMMARY OF THE INVENTION

By the present invention there is provided a motor vehicle safety system including a safety belt attachable to at least two points on a vehicle body, the belt having operatively associated therewith a device incorporating an extrudable slug, the arrangement being such that on loading the belt to a predetermined level, the slug is extruded through at least one orifice, and the device is progressively elongated.

The safety belt may be a lap belt, a diagonal belt, both of which have only two anchorage points, a full harness, which has a lap belt combined with two shoulder belts, and has four anchorage points or a lap and diagonal belt in which the diagonal strap passes across the chest, and the lap belt passes across the waist. This latter belt, which is the most common in the UK may have two or even three devices. The belts may be only slightly extensible when stressed.

The devices are preferably attachable to the anchorage points on the vehicle, and have the seat belts attached to them.

Preferably the device comprises a cylinder, a rod extending through the cylinder and having an enlarged end adapted to engage a cylindrical slug of a deformable material, axial movement of the rod within the cylinder causing the slug to contact one end of the cylinder having a reduced diameter, and further movement of the rod in the same direction extruding the slug between the cylinder and the rod.

The slug may be of lead, aluminium or of a plastics material.

The rod may have a slot or slots along its length which, in conjunction with the walls of the cylinder form an orifice or orifices, through which the slug is extruded. The cross-sectional area of the slot or slots may be varied along its length so that the cross-sectional area of the orifice or orifices may vary as the slug is extruded. Alternatively, the rod may have a taper and may co-operate with the walls of the cylinder to form an orifice of effectively varying cross-section as the slug is extruded.

BRIEF DESCRIPTION OF THE DRAWINGS

By way of example only, embodiments of the present invention will now be described with reference to the accompanying drawings, of which.

DESCRIPTION OF THE PREFERRED EMBODIMENT

Figure 1:
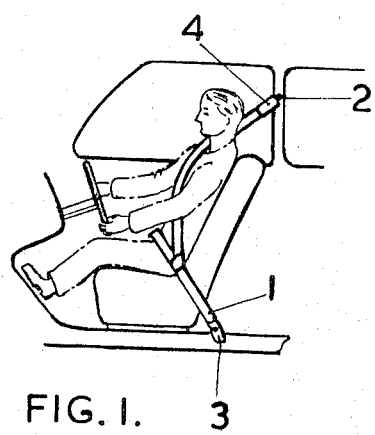
FIG. 1 is a side elevation of a general seat belt arrangement.
Figure 2:
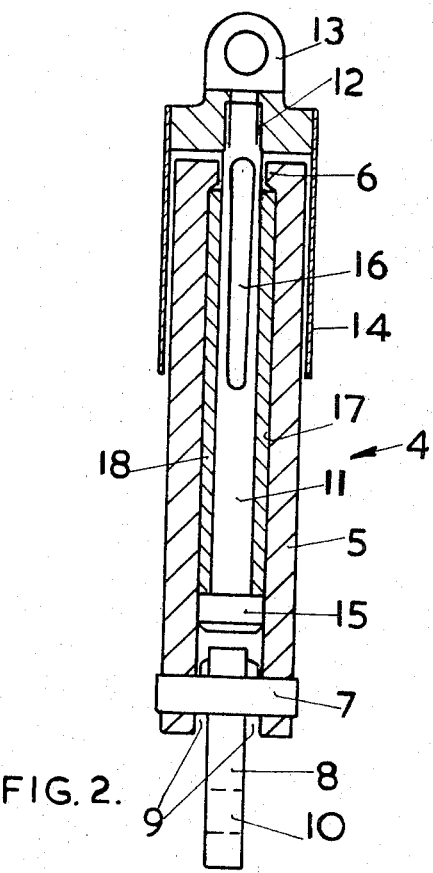
FIG. 2 is a cross-section of one form of device.

Referring to FIG. 1, a lap and diagonal seat belt 1 is mounted on the door pillar at 2, and is bolted to the floor at 3 and on the other side of the seat. The belt is bolted to a device 4, and the device is bolted to the door pillar at 2. FIG. 2 illustrates the device 4 in greater detail.

The device has a cylindrical body 5 which has a restricted portion 6 at one end, and a cross-bar 7 at the other end. Attached to the cross-bar 7 is a strap 8 which is held centrally by a pair of washers 9. The strap 8 has a hole 10 to which the belt 1 is attached. Located in the cylinder is a rod 11 which has a threaded end 12 to which is attached an eyelet 13. The skirt 14 extends downwardly from the eyelet 13 to surround part of the cylinders. The rod has an enlarged end 15 which is a sliding fit within the bore 17 of the cylinder 5. At the upper end of the rod (as seen in the drawings) there are slots of which one is shown in the drawing at 16. The slots taper in cross-sectional area as they extend towards the enlarged end 15. Located in the bore 17 is a cylindrical slug of lead 18.

In the event of an accident in which the occupant is thrown forward into the belt, there is a tension load applied to the strap 8 and to the piston rod 11, which tends to extend the device since the end 13 is securely connected to the door pillar at 2. If the load is sufficiently large, the cylinder 5 is moved downwardly relative to the rod 11, and the end 15 of the rod 11 forces the lead slug through an orifice defined between the rod 11 and the restricted portion 6 of the cylinder. Because the slots 16 increase the effective cross-sectional area of the orifice, the lead can be more easily extruded over the initial part of the movement of the rod. However, as the slots reduce in area or disappear, the resistance to movement of the cylinder relative to the rod increases. The product of the resistance to movement and the distance moved gives a measure of the work done against the device. The work is transformed into heat which raises the temperature of the lead. The extruded lead is forced into the compartment 19, which catches the hot lead and prevents it passing into the passenger compartment of the vehicle, where it might cause harm to the occupants.

The belt which is used with the device is preferably relatively inelastic since an elastic belt permits the wearer to move forward whilst stretching the belt. This elastic extension of the belt does not remove any energy from the system and this energy manifests itself by the "whip-back" of the occupant from the maximum point of travel to impact the wearer onto the seat with a possible danger of breaking his neck. In the case of a system incorporating a device of the type described above, it is desirable that all of the room available for movement of the occupant in the vehicle be taken up by the extension of the device, rather than by useless elastic extension of the belt.

It can be seen that the safety belt system in accordance with the invention is very compact. Initially only a device is needed to form a link in the system, however, the great benefits are obtained using the device in conjunction with a more rigid than normal belt as is explained above.

A further feature of the invention is that it enables a controlled amount of energy to be removed in the event of an accident at a low speed, where the kinetic energy of the occupant is relatively low. As there is requirement for a high ultimate strength for the belt, this necessarily sets most of the properties of the belt, including to a certain extent its elasticity. This means that in low speed accidents, the occupant can stress the belt solely in the elastic region and the level of stress which will be imposed may be high. With a belt incorporating the device, the device can be designed to yield at a level below the plastic deformation level of the belt, and thus energy can be dissipated which would otherwise be stored to "whip" the occupant back into the seat.

Also the devices enable extension of the system at whatever point is required, i.e., in the shoulder portion or in either of the leg portions.

We claim:

1. A vehicle safety belt system comprising a safety belt and an energy absorbing device connected for absorbing energy when a predetermined tension load is placed on the belt, said energy absorbing device including a cylinder having at least one extrusion orifice in one of its ends, a piston rod having an enlarged head at its inner end disposed within the cylinder and having an outer end extending through said extrusion orifice in said one end of the cylinder, the piston rod having at least one slot which in conjunction with the wall of the extrusion orifice defines the effective cross-sectional area through which material is extrudable, an extrudable slug within the cylinder between said enlarged head and said extrusion orifice, means connecting the cylinder to one of said vehicle or said belt, and means connecting the outer end of the piston rod to the other of said vehicle or said belt whereby a predetermined tension load on said belt creates a tension load in the piston rod causing relative axial movement between the piston rod and the cylinder and thereby causing the slug to be extruded through the space between the extrusion orifice and the piston rod.

2. A system as in claim 1 wherein said device is located adjacent an anchorage point in the vehicle.

3. A system as in claim 1 wherein the piston rod extends through the extrusion orifice whereby axial separating movement between the cylinder and the piston rod causes extrusion of the slug through a space between the piston rod and the wall of the extrusion orifice.

4. A system as in claim 3 wherein the slug is made of a material selected from the group consisting of lead or plastics material.

5. A system as in claim 1 in which the cross-sectional area of the slot varies along its length so that the cross-sectional area of the orifice varies as the slug is extruded.

* * * * *